(12) United States Patent
Kim (10) Patent No.: US 9,335,899 B2
(45) Date of Patent: May 10, 2016

(54) METHOD AND APPARATUS FOR EXECUTING FUNCTION EXECUTING COMMAND THROUGH GESTURE INPUT

(71) Applicant: Jungsoo Kim, Seoul (KR)

(72) Inventor: Jungsoo Kim, Seoul (KR)

( * ) Notice: Subject to any disclaimer, the term of this patent is extended or adjusted under 35 U.S.C. 154(b) by 219 days.

(21) Appl. No.: 14/095,025

(22) Filed: Dec. 3, 2013

(65) Prior Publication Data

US 2014/0157182 A1 Jun. 5, 2014

(30) Foreign Application Priority Data

Dec. 3, 2012 (KR) ......................... 10-2012-0138907

(51) Int. Cl.
*G06F 3/048* (2013.01)
*G06F 3/0482* (2013.01)
*G06F 3/0488* (2013.01)

(52) U.S. Cl.
CPC .......... *G06F 3/0482* (2013.01); *G06F 3/04883* (2013.01)

(58) Field of Classification Search
CPC ....... G06F 3/016; G06F 3/017; G06F 3/0237; G06F 3/048–3/04886; G06F 2203/04805–2203/04808
See application file for complete search history.

(56) References Cited

U.S. PATENT DOCUMENTS

| | | | | |
|---|---|---|---|---|
| 2008/0174570 A1* | 7/2008 | Jobs | ...................... | G06F 3/0488 345/173 |
| 2011/0320978 A1* | 12/2011 | Horodezky | ........... | G06F 3/0488 715/823 |
| 2012/0278734 A1* | 11/2012 | Ishizuka | ............... | G06F 1/1624 715/752 |

FOREIGN PATENT DOCUMENTS

| | | | |
|---|---|---|---|
| KR | 200110066025 A | | 6/2011 |
| KR | 20120003566 A | | 1/2012 |
| KR | 20120045528 A | | 5/2012 |

OTHER PUBLICATIONS

Office Action received in Korean Application No. 2013-028625014, dated Apr. 26, 2013.

* cited by examiner

*Primary Examiner* — Claudia Dragoescu
(74) *Attorney, Agent, or Firm* — Alchemy-Partners, PC (57) ABSTRACT

There are provided a method and an apparatus for executing a function executing command through a gesture input, and more particularly, a method and an apparatus for executing a function executing command by recognizing a gesture input performed in a text input field displayed on a touch screen display. The method for executing a function executing command through a gesture input includes displaying a keyboard window for inputting text and a text input field for displaying the text inputted by the keyboard window on a touch screen display; recognizing a gesture input performed in the text input field; and executing a function executing command corresponding to the gesture input only when the text displayed in the text input field is not selected. A user can intuitively execute function executing commands by recognizing a gesture input in a text input field with ease when the function executing command is input through a touch screen display.

6 Claims, 11 Drawing Sheets

METHOD AND APPARATUS FOR EXECUTING FUNCTION EXECUTING COMMAND THROUGH GESTURE INPUT

CROSS-REFERENCE TO RELATED APPLICATIONS

This application claims priority of Korean Patent Application No. 2012-0138907 filed on Dec. 3, 2012, with the Korean Intellectual Property Office, the disclosure of which is incorporated herein by reference.

BACKGROUND OF THE INVENTION

1. Field of the Invention

The present invention relates to a method and an apparatus for executing a function executing command through a gesture input, and more particularly, to a method and an apparatus for executing a function executing command by recognizing a gesture input performed in a text input field displayed on a touch screen display.

2. Description of the Related Art

A touch screen display means an apparatus that can receive a signal through a display by applying micro current or pressure to the display. The touch screen display is similar to a touchpad in that an input signal is applied through a touch sensor that recognizes the micro current or pressure. However, in the touchpad, a pointer on the display moves along with a relative movement of a finger or a touch pen input on the touchpad. Meanwhile, in the touch screen display, since a touch sensor and a touchpad are realized together, when a signal is applied to a specific point on the display, a pointer operates at the point. Thus, there is a difference between the touchpad and the touch screen display. Accordingly, when a signal is applied to the touch screen display through a finger, sensitivity of the recognition of the signal is very important. Recently, as a capacitive touch screen having excellent responsiveness to the input signal has been developed, various functions that can be executed through the touch screen display in electronic devices have been suggested.

In general, since the user inputs a signal or a gesture input by directly indicating a GUI object on the touch screen display with a stylus or a finger, the touch screen display does not need a separate input device. Such an advantage enables the touch screen display to be widely used in mobile devices. Further, as the mobile device including the touch screen display is widely used, many programs that have been run on a computer in the past are realized though the mobile device. For this reason, there is a need for a new design of a user interface that enables easy interaction between the user and the device including the touch screen display.

Even though the device including the touch screen display can execute many commands, since the touch screen display does not include an auxiliary input device, a conventional user interface has used a manner in which an input from a user is received by calling a menu window including many commands. Such a manner poses problems that a burden of recognition of a user is increased and efficiency is decreased. Further, when text is input from the user, for example, when the user inputs a text message, when the user writes a mail, when the user writes an address of a website in a address bar of a web browser, or when the user inputs a search word in a search box, an already narrow screen becomes narrower due to a text input field and a keyboard window for inputting text. At this time, when function executing commands executed on an application are allowed to be executed, since it has a disadvantage that the menu window needs to be called on the narrow screen to select a menu, there is a need for development of a method and an apparatus capable of reducing the burden of recognition of the user and offering a more efficient interface.

SUMMARY OF THE INVENTION

An object of the present invention is to provide a method and an apparatus capable of executing a function executing command by recognizing a gesture input performed in a text input field on a touch screen display when the function executing command is executed through the gesture input.

An object of the present invention is also to provide a method and an apparatus capable of executing various function executing commands of a user by recognizing a gesture input performed on a touch screen display without calling a separate menu window when the function executing command is executed through the gesture input.

The objects of the present invention are not limited to the aforementioned objects, and other objects, which are not mentioned above, will be apparent to those skilled in the art from the following description.

In order to achieve the above object, a method for executing a function executing command through a gesture input includes: displaying a keyboard window for inputting text and a text input field for displaying the text input through the keyboard window on a touch screen display; recognizing a gesture input performed in the text input field; and executing a function executing command corresponding to the gesture input only when the text displayed in the text input field is not selected.

According to another characteristic of the present invention, the function executing command is one of commands including a menu window calling command, an information sending command, a contact information attaching command, a file attaching command, a decorating command, an emoticon inserting command, a message deleting command, a useful sentences adding command, a spam number registering command, a recipient adding command, a unread displaying command, a moving command, a user adding command, a printing command, a user designating command, and a setting changing command.

According to still another characteristic of the present invention, the gesture input is a drag input.

According to still another characteristic of the present invention, in the recognizing of the gesture input, a gesture input performed in an upper area, a lower area, a left area, or a right area of the text input field is recognized.

According to still another characteristic of the present invention, in the recognizing of the gesture input, a gesture input performed in an upper right area, a lower right area, an upper left area, or a lower left area of the text input field is recognized.

According to still another characteristic of the present invention, an image representing that the gesture input is able to be performed is displayed in each of the areas of the text input field.

According to still another characteristic of the present invention, the gesture input is a tap input.

In order to achieve the above object, an apparatus including a touch screen display includes: a display that displays an image; a touch screen display that recognizes a gesture input; and a processor that changes the gesture input to a function executing command, in which the display displays a text input field, in which information is able to be input, the touch screen display recognizes the gesture input performed in the text input field, and the processor executes the function executing command corresponding to the gesture input.

According to another characteristic of the present invention, the function executing command is one of commands including a menu window calling command, an information sending command, a contact information attaching command, a file attaching command, a decorating command, an emoticon inserting command, a message deleting command, a useful sentences adding command, a spam number registering command, a recipient adding command, a unread displaying command, a moving command, a user adding command, a printing command, a user designating command, and a setting changing command.

According to still another characteristic of the present invention, the touch screen display that recognizes the gesture input recognizes a gesture input performed in an upper area, a lower area, a left area, or a right area of the text input field.

According to still another characteristic of the present invention, the touch screen display that recognizes the gesture input recognizes a gesture input performed in an upper right area, a lower right area, an upper left area, or a lower left area of the text input field.

According to still another characteristic of the present invention, an image representing that the gesture input is able to be performed is displayed in each of the areas of the text input field.

According to exemplary embodiments of the invention, a user can intuitively execute function executing commands by recognizing a gesture input in a text input field with ease when the function executing command is input through a touch screen display.

According to exemplary embodiments of the invention, it is possible to efficiently minimize a display area hidden by a menu window by recognizing a gesture input without calling a separate menu window and by executing various function executing commands of a user when the function executing command is input through a touch screen display.

The effects of the present invention are not limited to the aforementioned effects, and other effects, which are not mentioned above, will be apparent to those skilled in the art from the following description.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Various advantages and features of the present invention and methods accomplishing thereof will become apparent from the following description of embodiments with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims.

Although first, second, and the like are used in order to describe various components, the components are not limited by the terms. The above terms are used only to discriminate one component from the other component. Therefore, a first component mentioned below may be a second component within the technical spirit of the present invention.

The same reference numerals indicate the same elements even if the drawings are different each other throughout the specification for using the reference numerals.

For the specification, when any one element transmits data or signal to other elements, it means that the elements can directly transmit the data or signal to other elements or can transmit the data or signal to other elements through another element.

Combinations of each block of the accompanying block diagram and each step of the flow chart can be implemented by algorithms or computer program instructions comprised of firmware, software, or hardware. Since these algorithms or computer program instructions can be installed in processor of a universal computer, a special computer or other programmable data processing equipment, the instructions executed through a processor of a computer or other programmable data processing equipment generates means for implementing functions described in each block of the block diagram or each step of the flow chart. Since the algorithms or computer program instructions can be stored in a computer available or computer readable memory capable of orienting a computer or other programmable data processing equipment to implement functions in a specific scheme, the instructions stored in the computer available or computer readable memory can produce items involving an instruction means executing functions described in each block of the block diagram or each step of the flow chart. Since the computer program instructions can be installed in a computer or other programmable data processing equipment, a series of operation steps are carried out in the computer or other programmable data processing equipment to create a process executed by the computer such that instructions implementing the computer or other programmable data processing equipment can provide steps for implementing functions described in functions described in each block of the block diagram or each step of the flow chart.

Further, each block or each step may indicate a part of a module, a segment, or a code including one or more executable instructions for implementing specific logical function(s). Furthermore, it should be noted that in some alternative embodiments, functions described in blocks or steps can be generated out of the order. For example, two blocks or steps illustrated continuously may be implemented simultaneously, or the blocks or steps may be implemented in reverse order according to corresponding functions.

Figure 1:
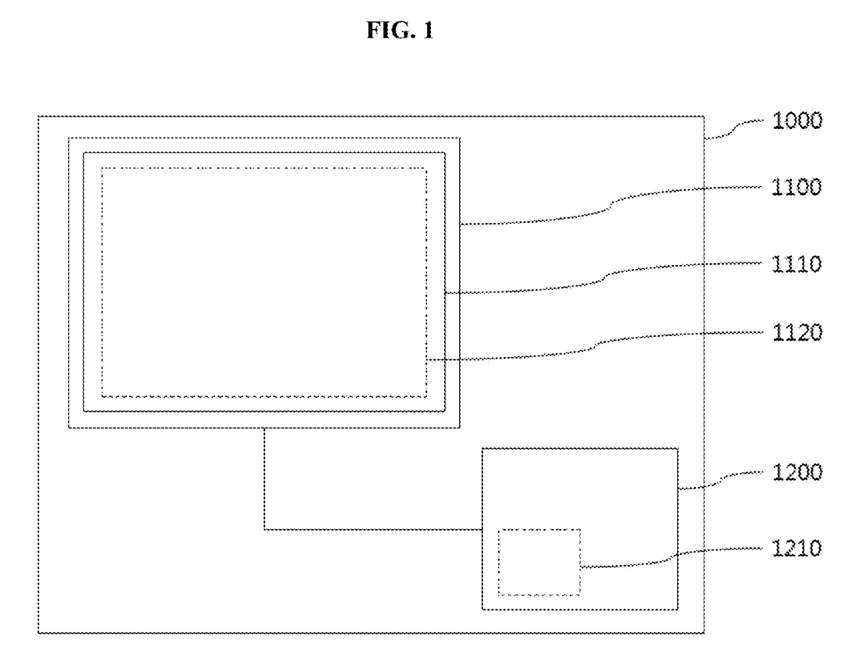
FIG. 1 is a configuration diagram of an algorithm processing module for executing a function executing command through a gesture input in a text input field on a touch screen display according to an exemplary embodiment of the present invention.

FIG. 1 is a configuration diagram of an algorithm processing module for executing a function executing command through a gesture input in a text input field on a touch screen display according to an exemplary embodiment of the present invention.

Referring to FIG. 1, an algorithm processing module 1000 for executing a function executing command through a gesture input in a text input field on a touch screen display may include a touch screen display 1100 and a processor 1200.

As shown in FIG. 1, the touch screen display 1100 may include a display panel 1110 that displays an image and a touch screen panel 1120 that receives a control signal. Accordingly, the touch screen display 1100 can receive a signal for controlling contents in addition to displaying a document or an image. The display panel 1110 and the touch screen panel 1120 may be implemented as one module depending on an implementing manner.

Meanwhile, the processor 1200 may include a memory 1210 as necessary. The memory 1210 may include one or more computer-readable storage media, and may be separately provided outside the processor 1200 depending on various exemplary embodiments of the invention, or may not be provided in another exemplary embodiment.

The algorithm processing module 1000 for executing a function executing command through a gesture input in a text input field on a touch screen display may be attached to an apparatus including a touch screen display, for example, a smart phone, a tablet PC, a navigation, a smart TV, and a smart monitor.

Hereinafter, an operating procedure of the algorithm processing module for executing a function executing command through a gesture input in a text input field on a touch screen display will be explained in detail.

Figure 2:
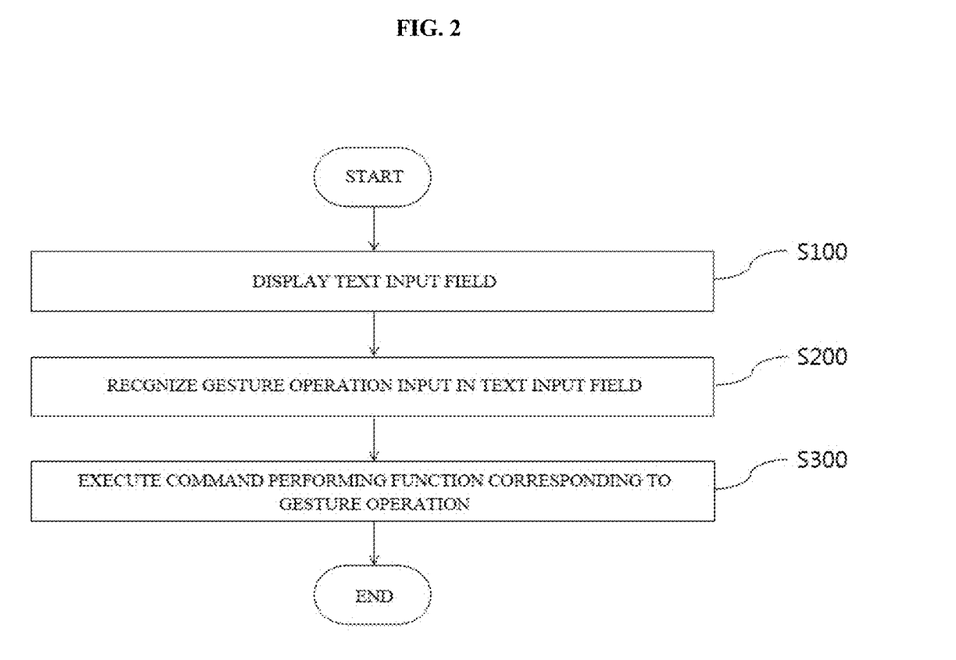
FIG. 2 is a flowchart of an algorithm for executing a function executing command through a gesture input in a text input field on a touch screen display according to the exemplary embodiment of the present invention.

FIG. 2 is a flowchart of an algorithm for executing a function executing command through a gesture input in a text input field on a touch screen display according to the exemplary embodiment of the present invention. For the sake of convenience in explanation, the description will be made with reference to the configuration of FIG. 1.

First, a text input field in which information is able to be input through the display panel 1110 of the touch screen display 1100 is displayed (S100).

The text input field means a field that gathers information input by a user to display the gathered information before the information input by the user is processed.

A keyboard window for inputting text and the text input field for displaying the input text may be displayed on the touch screen display so as to be distinguished from each other.

When the text input field is displayed, a gesture input performed in the text input field though the touch screen display 1100 is recognized (S200).

The user may input the gesture input on the touch screen display through a physical touch performed by physically bringing a finger or an input device such as a stylus contact with the touch screen display and a floating touch performed by allowing the finger or the input device to approach the touch screen display at an approximate distance without directly bringing the finger or the input device contact with the touch screen display.

The gesture input performed by the user may be matched to one or more coordinates on the touch screen display. Like a mouse click, a tap on the touch screen display corresponds to an input mapped on one position. At this time, the tap means a manner in which an input signal is applied by tapping a hand or the input device such as a stylus on the touch screen display. Meanwhile, like a mouse drag, the drag performed on the touch screen display may be mapped on two or more positions. Besides, the gesture input performed on the touch screen display may include a long-tap and multiple taps including a double-tap, and may further include a pinch-in and pinch-out which are multi-touch manners.

The double-tap means a manner in which an input signal is applied by tapping a hand or the input device such as a stylus on the touch screen display twice within a certain time. The multiple taps mean a manner in which an input signal is applied three times or more, and the long tap means a manner in which an input signal is applied while maintaining a signal input state of the touch screen display for a certain time or more, that is, a manner in which a tap operation is performed long. The multi-touch manner means a manner in which several coordinates are simultaneously recognized through the touch screen display. Accordingly, the aforementioned tap, drag, double-tap and long tap may be performed by two or more fingers. The pinch-in means a gesture input in which two fingers approach each other to touch the touch screen display and then the two fingers are allowed to slip outward. The pinch-out means a gesture input in which two fingers are allowed to spread out away from each other to touch the touch screen display and then the two fingers are allowed to slip inward (to be joined together) as if to pinch. The gesture input for executing a function executing command according to the exemplary embodiment of the present invention is not limited to the above-described gesture inputs, and may include various gesture inputs.

For example, the gesture input performed in the text input field means that when the gesture input corresponds to the drag input, a position at which the drag input starts to be performed is positioned within the text input field and a position at which the drag input is stopped is not limited to a specific position on the touch screen display.

According to the exemplary embodiment of the present invention, step S200 may be characterized in that a gesture input performed in an upper area, a lower area, a left area, or a right area of the text input field is recognized. This characteristic will be explained in detail with reference to FIGS. 5A and 5B.

According to the exemplary embodiment of the present invention, step S200 may be characterized in that a gesture input performed in an upper right area, a lower right area, an upper left area, or a lower left area of the text input field is recognized. This characteristic will be explained in detail with reference to FIGS. 6A and 6B.

When the gesture input is recognized through the touch screen display 1100, a function executing command corresponding to the gesture input recognized through the processor 1200 is executed (S300).

The input text is merely displayed in a conventional text input field, and the gesture input performed in the text input field is nothing more than editing the text. For example, the tap is nothing more than moving an insertion bar to which text is input, and the double tap is nothing more than selecting, copying and clipping the input text, or pasting the copied text. The long tap is nothing more than selecting the input text or displaying a magnifier for magnifying the input text to be easily viewed, and the drag is nothing more than reducing or enlarging an area where the text is selected. The function executing command executed according to the present invention means a command to be executed by an application in addition to editing the text as described above. For example, the function executing command corresponding to the gesture inputs may include a command for sending input information, a command for calling a menu window, and commands belonging to the called menu window.

The function executing command may be changed depending on an application being run. For example, in a text message application, the function executing command may include a message sending command, a contact information attaching command, a file attaching command, a message decorating command, a spam number registering command, a recipient adding command, an unread displaying command, a moving command, and a printing command, and may further include a function executing command designated by the user. Accordingly, one command of the aforementioned function executing commands may be executed depending on the gesture input recognized in step S200. That is, the gesture inputs serve as hot keys for executing the function executing commands.

FIGS. 3A to 3D are diagrams showing that function executing commands are executed through drag inputs in a text input field on a touch screen display according to the exemplary embodiment of the present embodiment.

As shown in FIGS. 3A to 3D, the gesture inputs performed in the text input field 1101 on the touch screen display 1100 may correspond to the drag inputs, and different function executing commands may be executed depending on a direction in which the drag is performed, such as an upper side, a lower side, a left side, or a right side. However, when the gesture input is the drag input, since a command used to edit the text is not triggered as long as the text is not selected, even though the gesture input is performed in any area within the text input field 1101 as long as the text is selected, the function executing commands corresponding to the drag gestures may be executed.

Figure 3A:
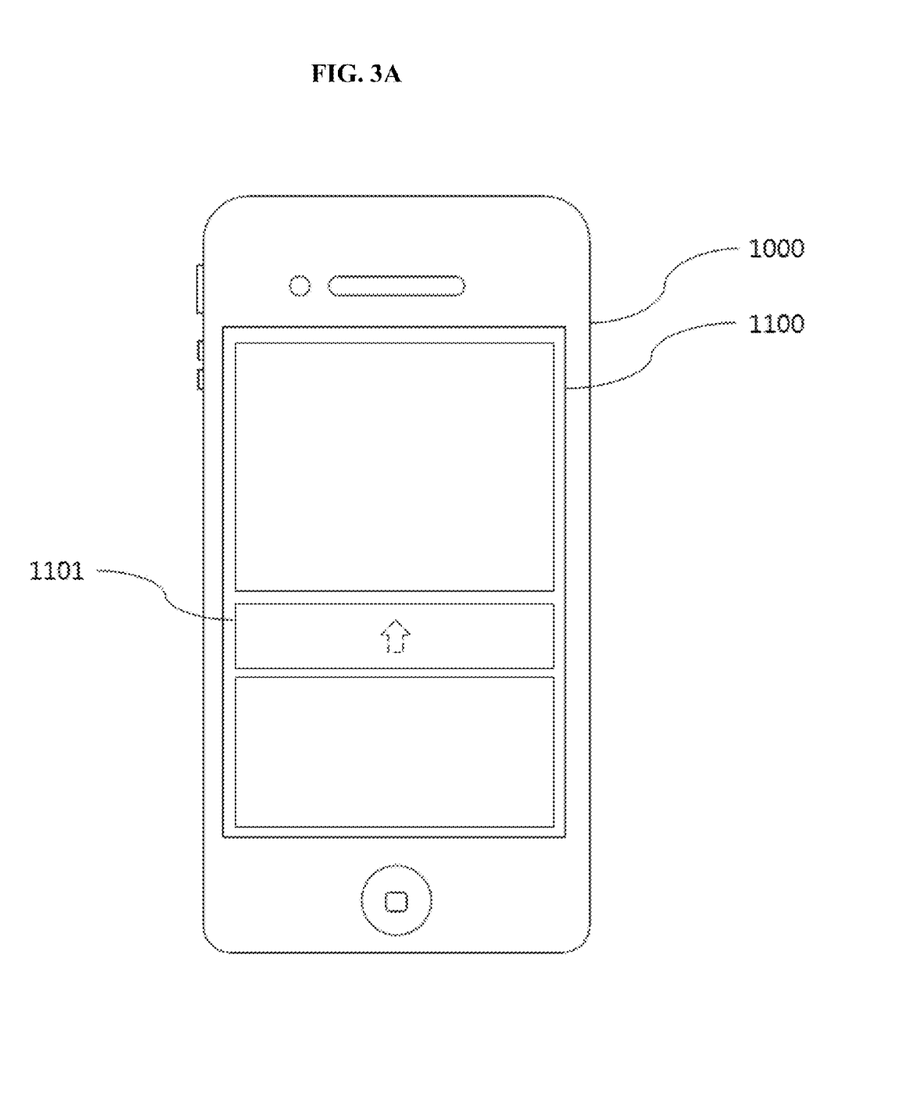
FIGS. 3A to 3D are diagrams showing that function executing commands are executed through a drag input in a text input field on a touch screen display according to the exemplary embodiment of the present embodiment.

FIG. 3A illustrates the drag input that is performed upward in the text input field 1101 on the touch screen display 1100. As shown in FIG. 3A, although the drag input is stopped within the text input field 1101, the drag input only needs to be input in the text input field 1101 as stated above and a position in which the drag input is stopped is not limited to a specific position on the touch screen display.

Figure 3B:
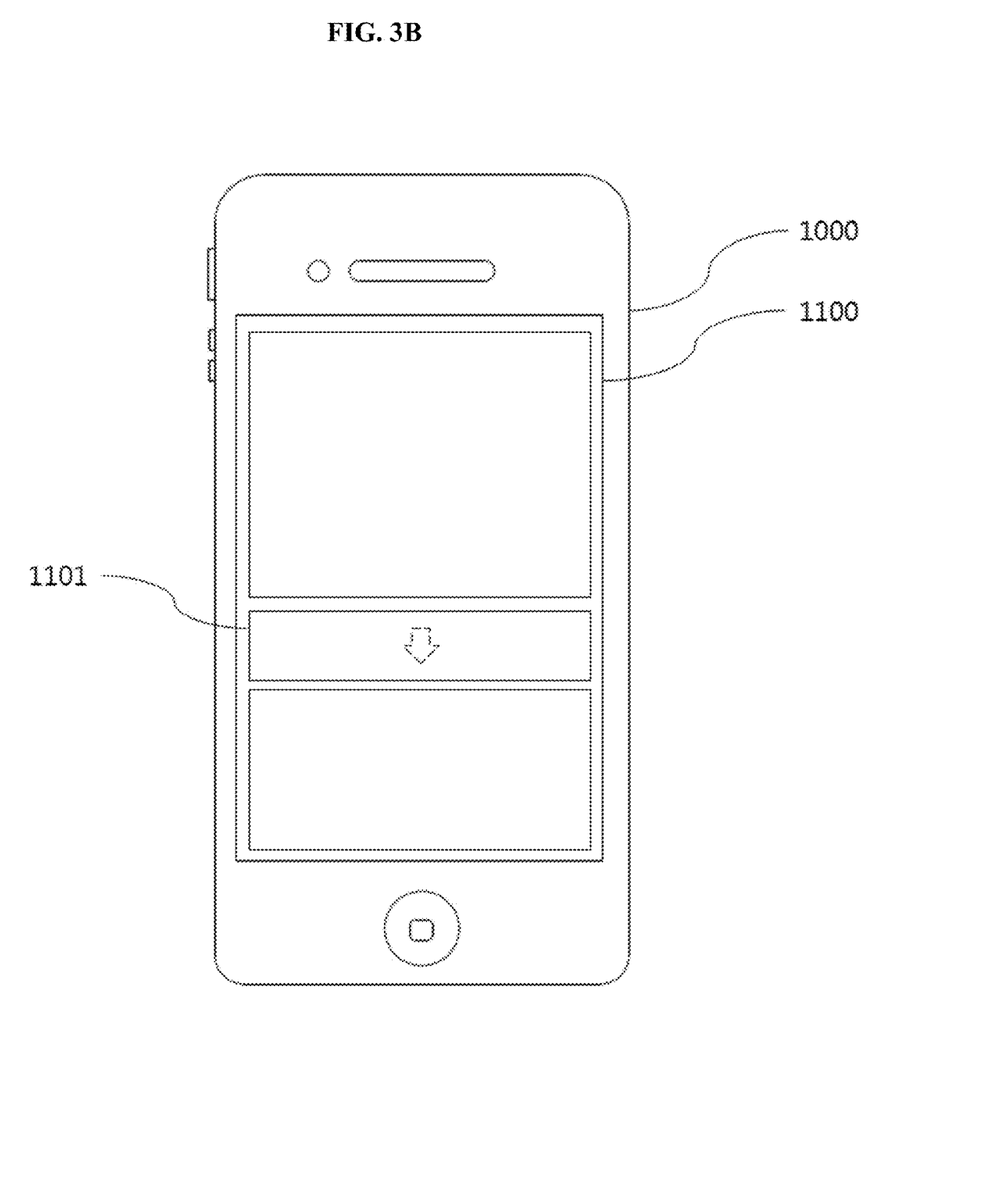
Figure 3C:
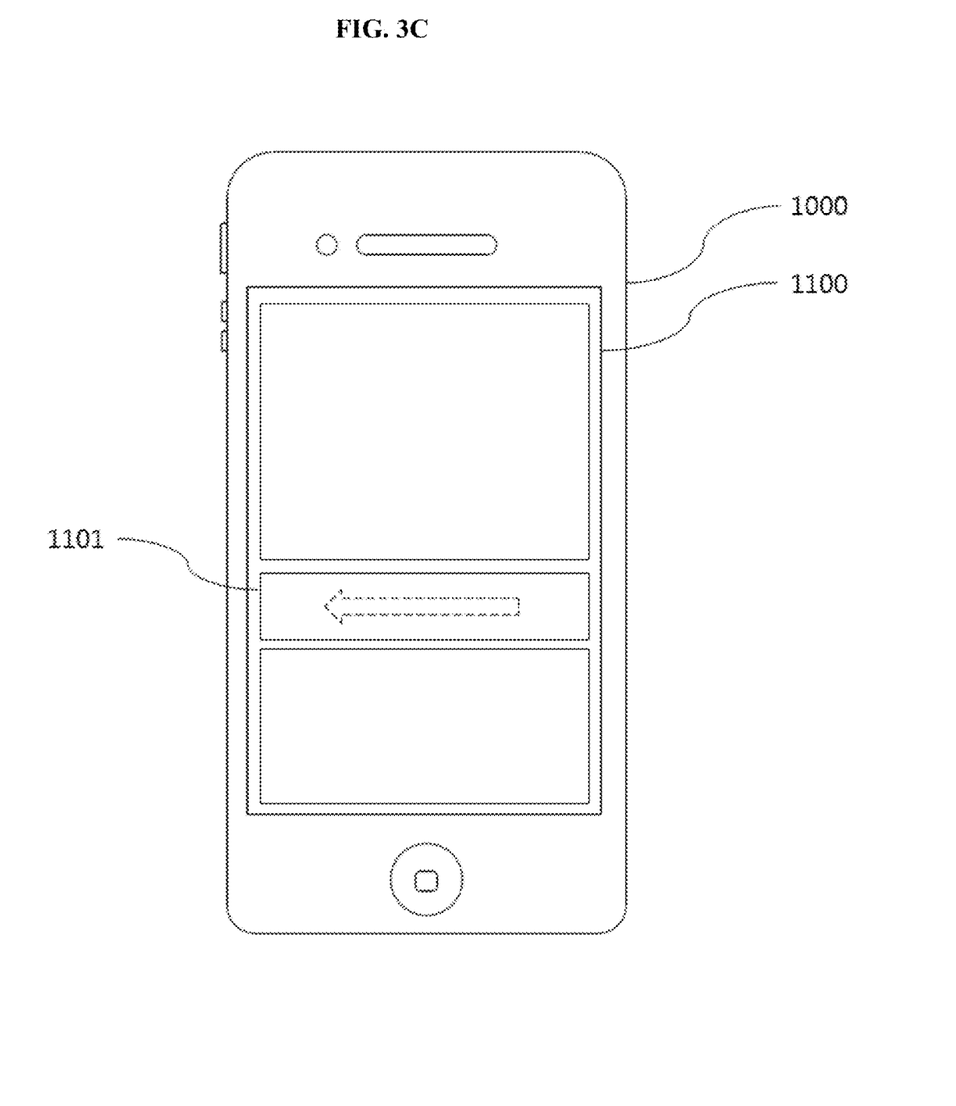
Figure 3D:
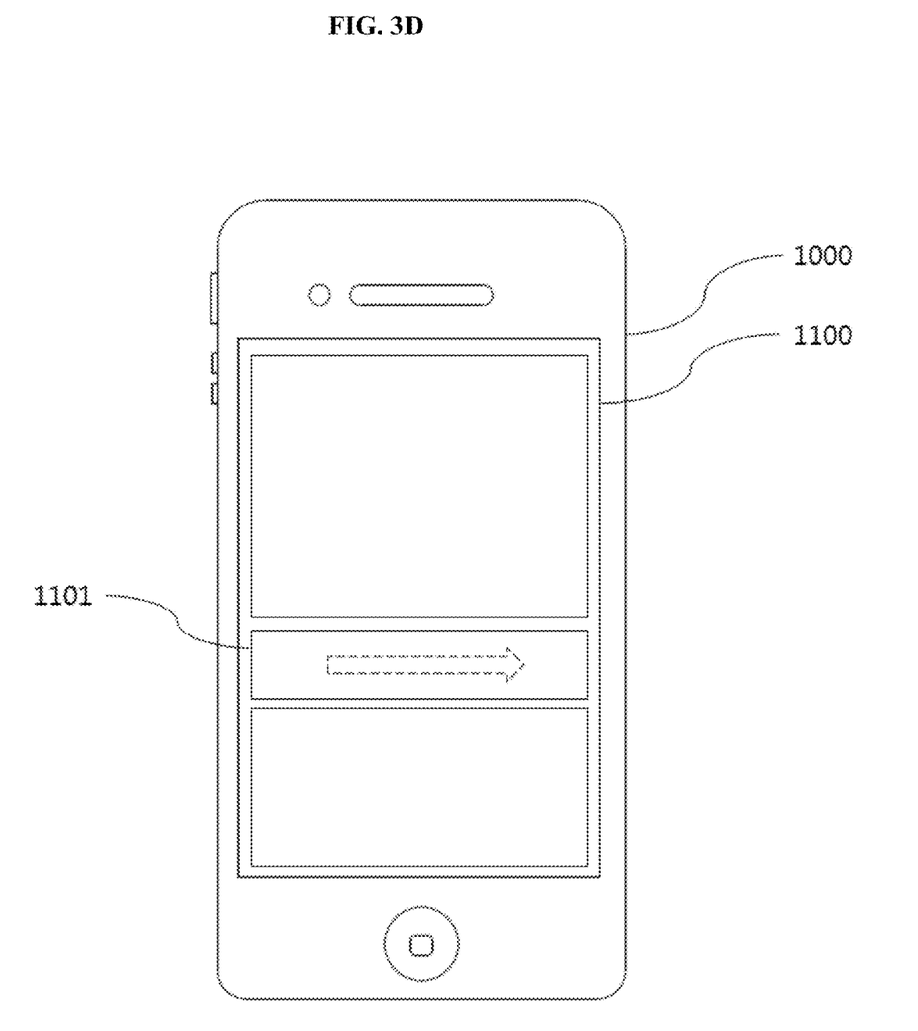

FIG. 3B illustrates the drag input that is performed downward, FIG. 3C illustrates the drag input that is performed toward the left, and FIG. 3D illustrates the drag input that is performed toward the right. As mentioned above, different function executing commands may be executed depending on a direction in which the drag is performed.

For example, in the case of the text message application, a message may be sent in response to the drag input performed upward, contact information or a file may be attached in response to the drag input performed downward, a menu window may be called in response to the drag input performed toward the left, and a function executing command designated by the user may be executed in response to the drag input performed toward the right.

In the case of a conventional text message application, since an icon for sending input text, a menu icon for calling a menu window and an icon for attaching information are included, there is a problem in that an area to be displayed to the user is restricted. Accordingly, according to the present invention, there are advantages in that a variety of function executing commands are executed by easily performing the gesture inputs on the touch screen display and an area to be display is increased.

Figure 4:
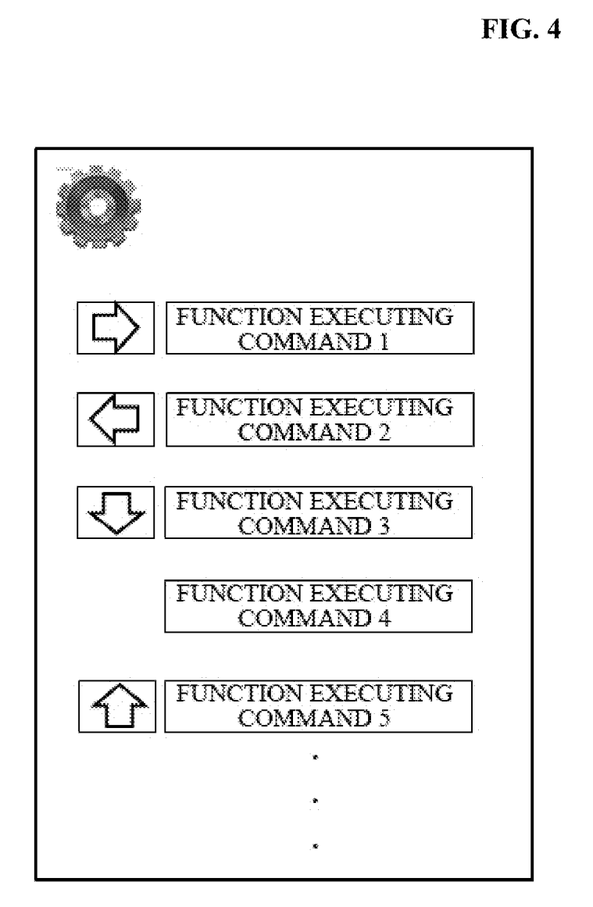
FIG. 4 is a diagram showing that function executing commands corresponding to gesture operations are arbitrary set a the text input field according to the exemplary embodiment of the present invention.

FIG. 4 is a diagram showing that function executing commands corresponding to gesture operations are arbitrary set in a text input field according to the exemplary embodiment of the present invention.

As shown in FIG. 4, the function executing commands and the gesture inputs may be arbitrary matched to each other by the user. Accordingly, the user can more conveniently execute the function executing commands through the gesture inputs. Referring to FIG. 4, it has been that the gesture inputs correspond to the drag inputs, but is not limited thereto. When the function executing commands are executed through various gesture inputs, the gesture inputs and the function executing commands may be matched to each other.

Figure 5A:
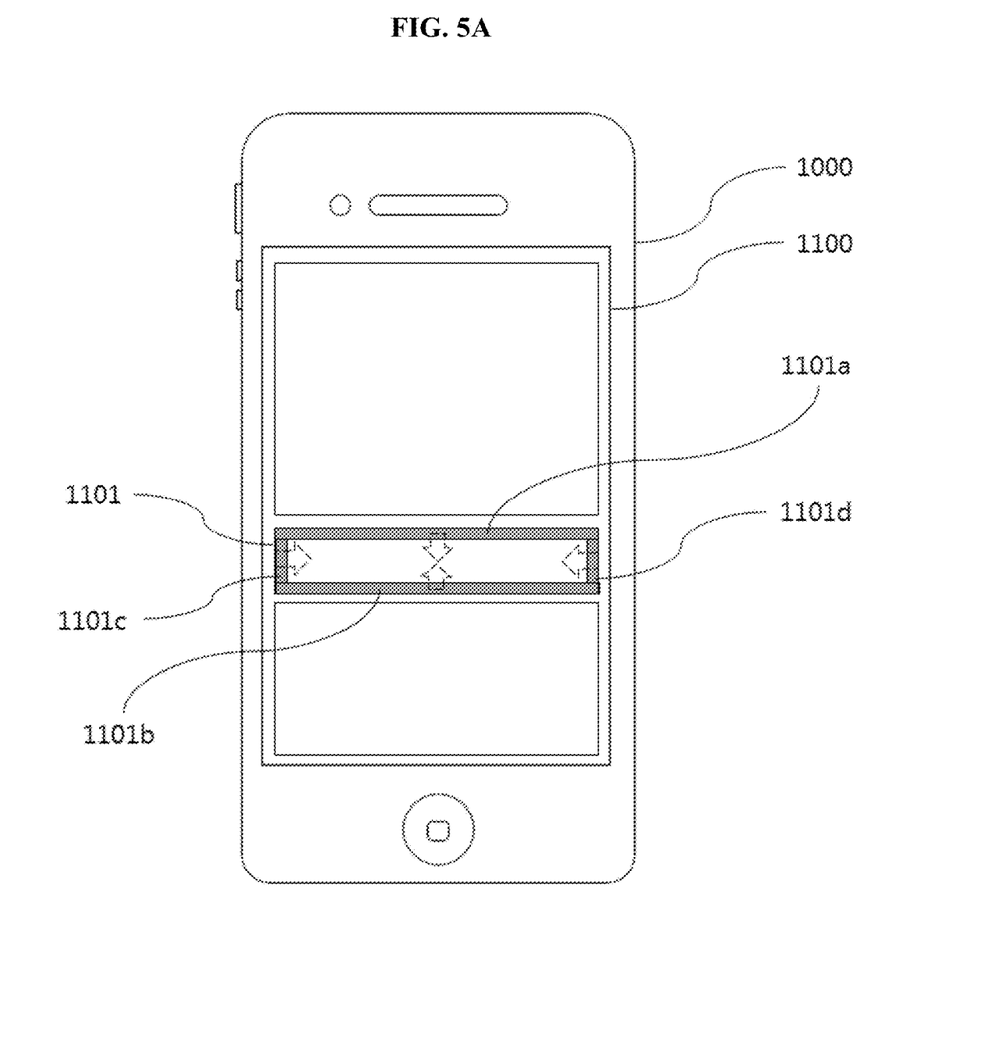
FIGS. 5A and 5B illustrate that function executing commands are executed through gesture inputs in one area of a text input field on the touch screen display according to the exemplary embodiment of the present invention and an image representing that the gesture input can be received is displayed in the area.
Figure 5B:
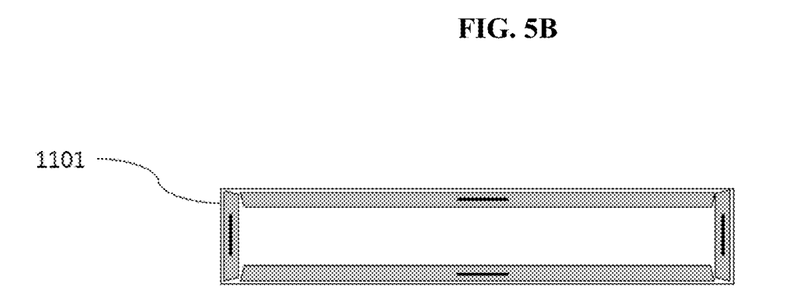

FIGS. 5A and 5B illustrate that function executing commands are executed through gesture inputs in one area of a text input field 1101 on a touch screen display according to the exemplary embodiment of the present invention and the image representing that the gesture input can be received is displayed in the area.

As shown in FIG. 5A, a gesture input performed from an upper area 1101a, a lower area 1101b, a left area 1101c, or a right area 1101d of the text input field 1101 may be recognized.

As stated above, the gesture input performed in the conventional text input field is used to edit the text. When the function executing commands are executed in response to only the gesture inputs performed in the specific area 1101a, 1101b, 1101c and 1101d of the text input field 1101, even though the gesture inputs performed in the specific area 1101a, 1101b, 1101c and 1101d are not the drag inputs, since commands used to edit the text are not triggered in response to the gesture inputs, the function executing command may be executed even though any gesture input is recognized.

As illustrated in FIG. 5B, an image representing that the gesture input can be received may be displayed in an area capable of receiving the gesture input as shown in FIG. 5A. Referring to FIG. 5B, the image is displayed in the upper area, the lower area, the left area, or the right area of the text input field 1101.

Figure 6A:
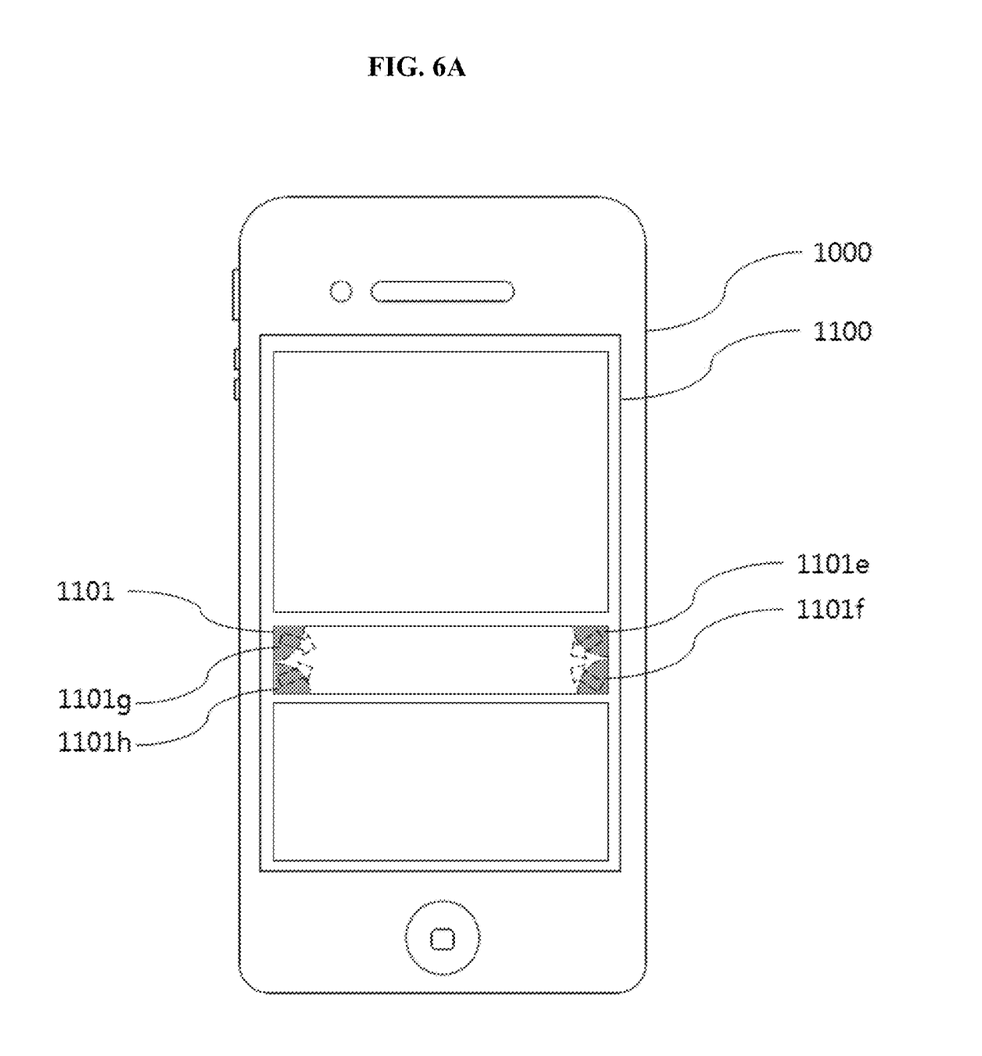
FIGS. 6A and 6B are diagrams illustrating that function executing commands are executed through gesture inputs in one area of a text input field on a touch screen display according to the exemplary embodiment of the present invention and an image representing that the gesture input can be received is displayed in the area.
Figure 6B:
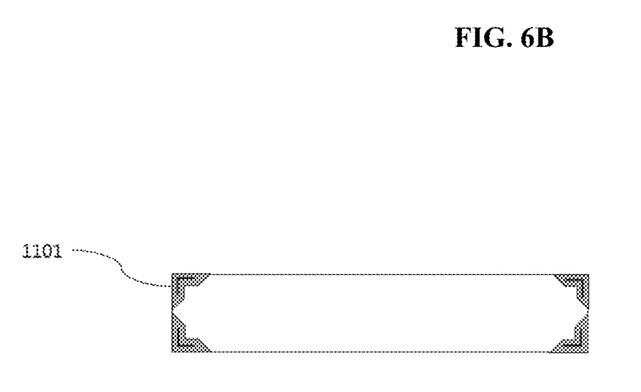

FIGS. 6A and 6B are diagrams illustrating that function executing commands are executed through gesture inputs in one area of the text input field 1101 on a touch screen display according to the exemplary embodiment of the present invention and the image representing that the gesture input can be received is displayed in the area.

As shown in FIG. 6A, the gesture inputs performed from an upper right area 1101e, a lower right area 1101f, an upper left area 1101g, or a lower left area 1101h of the text input field 1101 may be recognized.

When the function executing commands are executed in response to only the gesture inputs performed from the specific area 1101e, 1101f, 1101g and 1101h of the text input field 1101, even though the gesture inputs performed from the specific area 1101e, 1101f, 1101g and 1101h are not the drag inputs, since commands used to edit the text are not triggered in response to the recognized gesture inputs, the function executing command may be executed even though any gesture input is recognized.

As shown in FIG. 6B, an image representing that the gesture input can be received may be displayed in an area capable of receiving the gesture input as shown in FIG. 6A. Referring to FIG. 6B, the image is displayed in the upper right area, the lower right area, the upper left area, or the lower left area of the text input field 1101.

In this way, according to the present invention, when the function executing command is input through the touch screen display, the gesture input is recognized in the text input field, so that the user can intuitively execute the function executing commands with ease.

The steps of a method or algorithm described in connection with the embodiments disclosed in the present specification may be embodied directly in hardware, in a software module executed by a processor, or in a combination of the two. The software module may reside in RAM memory, flash memory, ROM memory, EPROM memory, EEPROM memory, register, hard disk, a removable disk, a CD-ROM, or any other form of storage medium known in the art. An exemplary storage medium is coupled to the processor such that the processor can read information from, and write information to, the storage medium. Otherwise, the storage medium may be integrated with the processor. The processor and the storage medium may reside in an application-specific integrated circuit (ASIC). The ASIC may reside in a user terminal. Otherwise, the processor and the storage medium may reside as discrete components in a user terminal.

The exemplary embodiments of the present invention have been described in more detail with reference to the accompanying drawings, but the present invention is not limited to the exemplary embodiments. It will be apparent to those skilled in the art that various modifications can be made without departing from the technical sprit of the invention. Accordingly, the exemplary embodiments disclosed in the present invention are used not to limit but to describe the technical spirit of the present invention, and the technical spirit of the present invention is not limited to the exemplary embodiments. Therefore, the exemplary embodiments described above are considered in all respects to be illustrative and not restrictive. The protection scope of the present invention must be interpreted by the appended claims and it should be interpreted that all technical spirits within a scope equivalent thereto are included in the appended claims of the present invention.

What is claimed is:

1. A method for executing a function executing command through a gesture input, the method comprising:
    displaying a keyboard window for inputting text and a text input field for displaying the text inputted by the keyboard window on a touch screen display;
    recognizing one of gesture inputs performed in the text input field, wherein the gesture inputs include gesture inputs from an upper area, a lower area, a left area, a right area, an upper right area, a lower right area, an upper left area, or a lower left area of the text input field; and
    executing a function executing command corresponding to the gesture input only when the text displayed in the text input field is not selected, wherein each of the gesture inputs corresponds to a different function;
    wherein the text input field for displaying the input text and the keyboard window for inputting the text are formed in different areas from each other,
    a display area hidden by a menu window or an icon on the touch screen display is minimized,
    the gesture input is a drag input, and
    the function executing command is a command for replacing a command corresponding to the menu window or the icon of an application being currently run.

2. The method according to claim 1, wherein the function executing command is one of commands including a menu window calling command, an information sending command, a contact information attaching command, a file attaching command, a decorating command, an emoticon inserting command, a message deleting command, a useful sentences adding command, a spam number registering command, a recipient adding command, a unread displaying command, a moving command, a user adding command, a printing command, a user designating command, and a setting changing command.

3. The method according to claim 1, wherein an image representing that the gesture input is able to be performed is displayed in each of the areas of the text input field.

4. An apparatus including a touch screen display, the apparatus comprising:
    a display that displays an image;
    a touch screen display that recognizes one of a gesture inputs, wherein the gesture inputs include gesture inputs from an upper area, a lower area, a left area, a right area, an upper right area, a lower right area, an upper left area, or a lower left area of the text input field; and
    a processor that changes the gesture input to a function executing command,
    wherein the display displays a keyboard window for inputting text and a text input field for displaying the text inputted by the keyboard window on the touch screen display,
    the touch screen display recognizes the gesture input performed in the text input field,
    the processor executes the function executing command corresponding to the gesture input only when the text displayed in the text input field is not selected,
    wherein each of the gesture inputs corresponds to a different function,
    a display area hidden by a menu window or an icon on the touch screen display is minimized,
    the gesture input is a drag input, and
    the function executing command is a command for replacing a command corresponding to the menu window or the icon of an application being currently run.

5. The apparatus according to claim 4, wherein the function executing command is one of commands including a menu window calling command, an information sending command, a contact information attaching command, a file attaching command, a decorating command, an emoticon inserting command, a message deleting command, a useful sentences adding command, a spam number registering command, a recipient adding command, a unread displaying command, a moving command, a user adding command, a printing command, a user designating command, and a setting changing command.

6. The apparatus according to claim 4, wherein an image representing that the gesture input is able to be performed is displayed in each of the areas of the text input field.

* * * * *